United States Patent
Aoki et al.

(10) Patent No.: US 7,216,128 B2
(45) Date of Patent: May 8, 2007

(54) DATA MERGING PROGRAM, DATA MERGING METHOD, AND SCORING SYSTEM USING DATA MERGING PROGRAM

(75) Inventors: Osamu Aoki, Tokyo (JP); Mikinori Seita, Tokyo (JP)

(73) Assignee: Intelligent Wave, Inc., Tokyo (JP)

( * ) Notice: Subject to any disclaimer, the term of this patent is extended or adjusted under 35 U.S.C. 154(b) by 463 days.

(21) Appl. No.: 10/747,039

(22) Filed: Dec. 30, 2003

(65) Prior Publication Data

US 2004/0225628 A1 Nov. 11, 2004

(30) Foreign Application Priority Data

May 9, 2003 (JP) .............................. 2003-131377

(51) Int. Cl.
G06F 7/00 (2006.01)
G06F 17/00 (2006.01)

(52) U.S. Cl. ........................................ 707/101; 706/45

(58) Field of Classification Search .................. 706/45, 706/20, 36; 705/39; 707/6, 10, 102; 717/149
See application file for complete search history.

(56) References Cited

U.S. PATENT DOCUMENTS 4,044,334 A * 8/1977 Bachman et al. ........... 707/102
5,544,354 A * 8/1996 May et al. ...................... 707/4
6,088,511 A * 7/2000 Hardwick ................... 717/149

OTHER PUBLICATIONS

Course on Bayesian Networks, Intelligent Wave, Inc., Dec. 10-13, 2002.
Hugin Expert, Course on Bayesian Networks, Dec. 10-13, 2002.

* cited by examiner

Primary Examiner—Alford Kindred
Assistant Examiner—Hung Tran Vy
(74) Attorney, Agent, or Firm—Bacon & Thomas, PLLC

(57) ABSTRACT

A data merging program causes a computer to perform a step of selecting a first cell as a starting point of merging; a step of comparing a first numerical value, which is recorded in the first cell, with a preset reference value; a step of, if the first numerical value is smaller than the reference value, calculating a total value of the first numerical value and a second numerical value recorded in a second cell adjacent to the first cell in the same column; a step of comparing the total value with the reference value and, if the total value is smaller than the reference value, setting a third cell into which the first and second cells are merged and recording the total value in the third cell; and a step of selecting the third cell as a new starting point of merging.

9 Claims, 15 Drawing Sheets

FIG. 4

DATA STRUCTURE

| from | to | DATA PORTION |
|---|---|---|

|   | A | B | C | D | E |
|---|---|---|---|---|---|
| 1 | 15 |   | 2 |   | 5 |
| 2 | 2 | 10 | 20 | 7 |   |
| 3 |   | 5 |   | 3 | 9 |
| 4 | 13 | 3 |   |   | 6 |

DATA STRUCTURE OF A1

| A-1 | A-1 | 15 |
|---|---|---|

DATA STRUCTURE OF C3

| C-3 | D-4 | 3 |
|---|---|---|

FIG. 7

|   | A  | B  | C  | D | E |
|---|----|----|----|---|---|
| 1 | 15 | 1  | N  | 1 | 3 |
| 2 | 1  | 10 | 20 | 7 | 2 |
| 3 | 1  | 5  | 2  | N | 9 |
| 4 | 15 | 8  | 1  |   | 6 |

FIG. 8

|   | A  | B  | C  | D | E |
|---|----|----|----|---|---|
| 1 | 15 | 1  | N  | 1 | 3 |
| 2 | 2  | 10 | 20 | 7 | 2 |
| 3 |    | 5  | 2  | N | 9 |
| 4 | 13 | 8  | 1  |   | 6 |

FIG. 9

|   | A | B | C | D | E |
|---|---|---|---|---|---|
| 1 | 15 | 1 | N | 1 | 5 |
| 2 | 2 | 10 | 20 | 7 |   |
| 3 |   | 5 | 5 | N | 9 |
| 4 | 13 | 8 |   |   | 5 |

FIG. 10

|   | A  | B  | C  | D | E |
|---|----|----|----|---|---|
| 1 | 15 | 1  |    | 1 | 5 |
| 2 | 2  | 10 | 20 | 7 |   |
| 3 |    | 5  | 5  |   | 9 |
| 4 | 13 | 8  |    |   | 6 |

FIG. 11

|   | A | B | C | D | E |
|---|---|---|---|---|---|
| 1 | 15 | 2 | | | 5 |
| 2 | 2 | 10 | 20 | 7 | |
| 3 | | 5 | 5 | | 9 |
| 4 | 13 | 8 | | | 6 |

US 7,216,128 B2

DATA MERGING PROGRAM, DATA MERGING METHOD, AND SCORING SYSTEM USING DATA MERGING PROGRAM

BACKGROUND OF THE INVENTION

1. Field of the Invention

The present invention relates to a data merging program which merges numerical data recorded in cells arranged in a matrix; a data merging method; and a scoring system which utilizes the data merging program and is adapted to calculate a score representing the probability of fraudulent use in response to a credit inquiry of a credit card or the like.

2. Description of the Related Art

Customarily, when a credit card is used, in order to prevent fraudulent transactions by a third party who has found the credit card and pretends to be the owner, the store or the like where the card is being used checks with the credit card company to ascertain the credit card balance as well as to conduct a credit inquiry concerning fraudulent use. In a system for such credit inquiry, quickness and accuracy of determination are important.

At present, credit card companies use a system which automatically determines a score for the possibility of fraudulent use on the basis of authorization data (data which is sent from the store or the like concerning the owner of the credit card, the monetary value of the transaction which is requested, etc.). In such systems, typically a score is determined by use of a scoring system which utilizes a neural network using neural theory (see Nonpatent Document 1).

A neural network is leading-edge technology which models the structure and information processing function of nerve cells of the human brain. Constructing such a system requires special know-how and a large monetary investment. Accordingly, many credit card companies do not themselves construct a basic system for score determination, but instead typically introduce a general purpose, external system for portions relating to a neural network.

Nonpatent Document 1

Asano Yoichiro, Suda Yoshinobu, "Introduction of a Fraudulent Use Detection System and Its Results", Gekkan Syohishashinyo, Kinzai Institute for Financial Affairs Research Group, May 2000, pages 16–19.

However, a scoring system using a neural network has problems, in that the logic for making a determination is a black box, so that the basis of determination is unclear to the credit card company or the like which utilizes it. In addition, as the user such as the credit card company does not itself create the neural network, difficulty is encountered in reflecting trends from the authorization data for that company. A conceivable measure for coping with such problems is to construct, in place of a neural network, a scoring system using a Bayesian network which uses Bayesian theory, which has recently come into use in the fields of artificial intelligence and the like.

A Bayesian network classifies objective events into patterns according to individual factors and statistically obtains the probability of occurrence of an event from past record values in the respective patterns. For example, when a Bayesian network is used for determination of fraudulent use of a credit card, factors such as the time, the monetary value, and the purchased article contained in authorization data are extracted, and, for example, data are collected for an individual pattern such as "use during the time period 15:00–18:00 to purchase an article having a monetary value of up to 10,000 yen" or "purchase of electric appliances having a monetary value of 50,000 yen–100,000 yen." From the ratio between the total number of samples for each pattern and the number of frauds for that pattern, the probability of occurrence of fraudulent use is calculated as a score.

Specifically, in scoring according to a Bayesian network, as illustrated in FIG. 14, a matrix whose coordinates (columns and rows) are factors contained in authorization data is created, and for each pattern, the number of samples and the number of frauds are plotted in a corresponding cell of this matrix. For example, upon receipt of an inquiry for determination on use of a credit card at 15:00 for a purchase having a monetary value of 20,000 yen, a score is calculated from a piece of past record data indicating that a single occurrence of fraud appeared among 120 samples, by referring to the cell of 12:00–18:00 and 10,000 yen–50,000 yen. If such a method is utilized, the basis of determination is clear to the credit card company, and the credit card company can construct a scoring system matching the trend of users of that company, while reflecting, in such data, the authorization data concerning the use of credit cards by the users of that company.

If the factors contained in authorization data are of two different kinds such as "time" and "monetary value," a two-dimensional matrix like the above-mentioned example of FIG. 14 is used. Alternatively, if the factors contained in authorization data are of three kinds including an additional factor; e.g., "article," a three-dimensional matrix as that shown in FIG. 15 including an additional coordinate is used. Further, if other kinds of factors such as "store" and "attribute of user" are added, a multi-dimensional matrix such as a four—or five-dimensional matrix is constructed.

The problem with this method using a multi-dimensional matrix is that as the number of dimensions of the matrix increases, the number of cells to be contained in the matrix becomes enormous, thereby increasing the load of processing of the system imposed for scoring, rendering a speedy determination difficult. Increasing the number of factors is preferable, from the viewpoint of more accurate determination; however, the increase in the number of factors leads to a decrease in processing speed. In scoring of credit card use, because the store is reluctant to keep a customer waiting for a long time for credit inquiry, speedy determination must be performed.

Further, when the number of cells increases with the increase in number of factors, the number of samples of past record data to be contained in a single cell decreases. As a result, when the number of samples to be contained in a cell is too small, the result of calculation of scoring is likely to be scattered. If a single fraudulent use happens to occur with a certain combination of factors, a score to be notified as a response to the store is that the probability of occurrence of fraud is 100%, provided that no other sample exists. An essential measure for preventing such a phenomenon is to set the number of samples to be contained in a single cell to a value equal to or larger than a fixed value that would prevent scattering of the result of calculation.

SUMMARY OF THE INVENTION

An object of the present invention is to cope with the above-described problems and to provide a data merging program which is used in the case where sample data are disposed in cells arranged in a multi-dimensional matrix, whose coordinates correspond to a plurality of factors, in the course of credit inquiry of credit cards or the like, the program merging numerical data recorded in the cells arranged in the multi-dimensional matrix, in order to reduce the number of excessively increased cells to thereby improve the processing speed, and to cause each cell to contain at least a predetermined number of samples to thereby prevent scattering of scoring result.

Another object of the present invention is to provide a data merging method.

Still another object of the present invention is to provide a scoring system which utilizes the data merging program in calculation of a score representing the probability of fraudulent use.

According to a first aspect, the present invention solves the above-described problems by providing a data merging program which merges numerical values recorded in cells arranged in a matrix, the program causing a computer to perform a step of selecting a first cell as a starting point of merging; a step of comparing a first numerical value, which is recorded in the first cell, with a preset reference value; a step of, if the first numerical value is smaller than the reference value, calculating a total value of the first numerical value and a second numerical value recorded in a second cell adjacent to the first cell in the same column; a step of comparing the total value with the reference value and, if the total value is less than the reference value, setting a third cell into which the first and second cells are merged and recording the total value in the third cell; and a step of selecting the third cell as a new starting point of merging. The data merging program may cause the computer, if the total value is larger than the reference value, to perform a step of selecting the second cell as a new starting point of merging without merging the first and second cells.

In the first aspect of the present invention, for cells arranged in a matrix, the data merging program first determines whether a cell serving as a starting point includes a value greater than a predetermined value, and then repeats an operation of successively merging adjacent cells in the same column and recording the total of numerical values contained in the cells until the total exceeds a predetermined value, whereby the numerical value recorded in each cell is prevented from becoming very small, and the total cell number can be reduced through merging of cells. As a result, scattering of numerical values in cells can be prevented, and the speed of processing for obtaining numerical values in cells can be increased.

Basically, cells are arranged in a two-dimensional matrix having two coordinates. Even in the case where cells are arranged in a multi-dimensional matrix structure having one or more additional coordinates, the same result can be achieved by performing the above-mentioned processing sequentially for cells in each column or row on an arbitrary coordinate. The expression "the total value is less than the reference value" encompasses the case in which the total value is equal to the reference value and the case in which the total value is not equal to the reference value. The expression "the total value is greater than the reference value" encompasses the case in which the total value is equal to the reference value and the case in which the total value is not equal to the reference value.

The data merging program according to the first aspect of the present invention may cause the computer to perform a step of comparing the reference value and the total value, and if the total value is greater than the reference value, setting a third cell into which the first and second cells are merged and recording the total value in the third cell; and a step of selecting, as a new starting point of merging, a fourth cell which is adjacent to the third cell in a merging direction.

Merging of cells may be successively carried out up to a point immediately before the total of numerical values reaches the reference value. According to the above-described alternative, however, merging of cells is continued up to a point immediately after the total becomes larger than the reference value. This features guarantees that the numerical value recorded in every cell is equal to or larger than the reference value.

The data merging program according to the first aspect of the present invention may cause the computer, if the cell selected as a new starting point of merging is located at an end of a column and any cell adjacent to that cell in the direction of merging does not exist, to perform a step of selecting, as a new starting point of merging, a cell at an end of a column adjacent to the column in which the cell selected as a new starting point of merging exists.

By virtue of the above feature, merging for all columns can be performed by a single startup process, because, upon completion of merging for a particular column, merging for the next column begins.

The data merging program according to the first aspect of the present invention may cause the computer, upon completion of merging for all columns, to perform a step of selecting a fifth cell as a new starting point of merging; a step of comparing an adjoining side of the fifth cell with an adjoining side of a sixth cell adjacent to the fifth cell in the same row; a step of calculating a total value of a fifth numerical value recorded in the fifth cell and a sixth numerical value recorded in the sixth cell if the adjoining sides of the fifth and sixth cells match; a step of comparing the total value with a preset reference value and, if the total value is smaller than the reference value, setting a seventh cell into which the fifth and sixth cells are merged and recording the total value in the seventh cell; and a step of selecting the seventh cell as a new starting point of merging.

By virtue of the above feature, merging for columns and rows can be performed continuously by a single startup process, because when merging for all columns is completed, merging of cells in each row is started and performed on a row-after-row basis.

The data merging program according to the first aspect of the present invention may cause the computer, if two adjoining sides of the fifth and sixth cells do not match, to perform a step of selecting the sixth cell as a new starting point of merging without merging of the fifth and sixth cells.

When merging on the row-after-row basis begins after completion of merging on the column-after-column basis, at a location where two or more cells have been joined in the column direction into a composite cell, the composite cell extends across a plurality of rows, with the possible result that the adjoining sides of neighboring cells do not match during merging on the row-after-row basis. In such a case, it is desirable to proceed to the next cell without performance of merging, and repeat the processing in such a manner that merging on the column-after-column basis is performed after merging on the row-after-row basis, and vice versa, to thereby perform merging in a stage in which the adjoining sides match.

In the first aspect of the present invention, merging is started from neighboring cells in the same column. Alternatively, merging may be started from cells in the same row. In this case as well, the same effects as those achieved by the first aspect of the present invention can be attained; i.e., the numerical value recorded in each cell is prevented from becoming very small, and the total cell number can be reduced through merging of cells.

Namely, according to a second aspect of the present invention, there is provided a data merging program which merges numerical values recorded in cells arranged in a matrix, the program causing a computer to perform a step of selecting a first cell as a starting point of merging; a step of comparing a first numerical value, which is recorded in the first cell, with a preset reference value; a step of, if the first numerical value is smaller than the reference value, calculating a total value of the first numerical value and a second numerical value recorded in a second cell adjacent to the first cell in the same row; a step of comparing the total value with the reference value and, if the total value is smaller than the reference value, setting a third cell into which the first and second cells are merged and recording the total value in the third cell; and a step of selecting the third cell as a new starting point of merging. The data merging program may cause the computer, if the total value is larger than the reference value, to perform a step of selecting the second cell as a new starting point of merging without merging the first and second cells.

The data merging program according to the second aspect of the present invention may cause the computer, if the total value is larger than the reference value, to perform a step of setting a third cell into which the first and second cells are merged and recording the total value in the third cell; and a step of selecting, as a new starting point of merging, a fourth cell which is adjacent to the third cell in a merging direction.

The data merging program according to the second aspect of the present invention may cause the computer, if, the cell selected as a new starting point of merging is located at an end of a row and any cell adjacent to that cell in the direction of merging does not exist, to perform a step of selecting, as a new starting point of merging, a cell at an end of a row adjacent to the row in which the cell selected as a new starting point of merging exists.

The data merging program according to the second aspect of the present invention may cause the computer, upon completion of merging for all rows, to perform a step of selecting a fifth cell as a new starting point of merging; a step of comparing an adjoining side of the fifth cell with an adjoining side of a sixth cell adjacent to the fifth cell in the same row; a step of calculating a total value of a fifth numerical value recorded in the fifth cell and a sixth numerical value recorded in the sixth cell if the adjoining sides of the fifth and sixth cells match; a step of comparing the total value with a preset reference value and, if the total value is smaller than the reference value, setting a seventh cell into which the fifth and sixth cells are merged and recording the total value in the seventh cell; and a step of selecting the seventh cell as a new starting point of merging.

The data merging program according to the second aspect of the present invention may cause the computer, if two adjoining sides of the fifth and sixth cells do not match, to perform a step of selecting the sixth cell as a new starting point of merging without merging of the fifth and sixth cells.

Further, the present invention provides data merging methods which utilize the data merging programs of the first and second aspects of the present invention, respectively.

According to a third aspect, the present invention solves the above-mentioned problems by providing a scoring system which, in response to a credit inquiry for a transactor (person who is transacting), calculates a score representing the probability of fraudulent transaction, the scoring system comprising: transaction data receiving means for receiving transaction data concerning transactors or contents of past transactions for which credit inquiries were made in the past; fraudulent transaction data receiving means for receiving fraudulent transaction data concerning transactors or contents of fraudulent transactions among the past transactions; number-of-occurrence storing means for classifying, into patterns, factors contained in the transactors or transaction contents in the transaction data and the fraudulent transaction data and storing the number of the transactions and the number of the fraudulent transactions for each pattern; data compressing means for compressing data representing the number of the transactions and the number of the fraudulent transactions, which are stored in the number-of-occurrence storing means, to obtain number-of-occurrence data; fraud detection model storing means for storing the number-of-occurrence data produced by the data compressing means, as a fraud detection model; and score calculating means for, upon receipt of a request for determination of probability of fraudulent transaction, calculating a score concerning the probability of fraudulent transaction with reference to the fraud detection model. In the number-of-occurrence storing means, the number of the transactions and the number of the fraudulent transactions for each pattern are recorded, as a numerical value, in a corresponding one of cells classified according to patterns and arranged in a matrix. The data compressing means includes a data merging program for merging the numerical values recorded in the cells. The credit inquiry is an inquiry as to whether or not the transactor who makes a transaction using a credit card has the ability of payment by the credit card. The transaction data are authorization data.

In the third aspect of the present invention, during calculation of a score representing the probability of fraudulent transaction from data prepared by classifying into patterns past transactions and fraudulent transactions contained therein, a program for merging numerical values recorded in a plurality of cells is utilized in order to prevent the numerical value recorded in each cell from becoming very small and reduce the total number of cells through cell merging. As a result, scattering of numerical values in cells is prevented, and the speed of processing for obtaining numerical values from the cells is increased, so accurate and speedy scoring can be achieved.

Here, the factors contained in the transactors or contents of transactions are information items, such as the attribute of transactor, the time of transaction, and the amount of transaction, which can be used to classify the transactions into patterns. Cells contained in a matrix constructed with these factors being coordinates are minimum units corresponding to basic patterns of transactions.

The data merging program used in the scoring system according to the third aspect of the present invention may cause the computer to perform a step of selecting a first cell as a starting point of merging; a step of comparing a first numerical value recorded in the first cell, with a preset reference value; a step of, if the first numerical value is smaller than the reference value, calculating a total value of the first numerical value and a second numerical value recorded in a second cell adjacent to the first cell in the same column; a step of comparing the total value with the reference value and, if the total value is smaller than the reference value, setting a third cell into which the first and second cells are merged, and recording the total value in the third cell; and a step of selecting the third cell as a new starting point of merging.

The data merging program used in the scoring system according to the third aspect of the present invention may cause the computer to perform a step of selecting a first cell as a starting point of merging; a step of comparing a first numerical value recorded in the first cell, with a preset reference value; a step of, if the first numerical value is smaller than the reference value, calculating a total value of the first numerical value and a second numerical value recorded in a second cell adjacent to the first cell in the same row; a step of comparing the total value with the reference value and, if the total value is smaller than the reference value, setting a third cell into which the first and second cells are merged, and recording the total value in the third cell; and a step of selecting the third cell as a new starting point of merging.

As described above, the scoring system according to the third aspect of the present invention can effectively merge data by utilizing the data merging programs according to the first and second aspects of the present invention,

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 4 is a diagram showing the structure of data as compressed by the data merging program according to the present invention;

FIG. 7 is a diagram showing a first step of the data compressing process by the data merging program according to the present invention;

FIG. 8 is a diagram showing a second step of the data compressing process by the data merging program according to the present invention;

Figure 9:
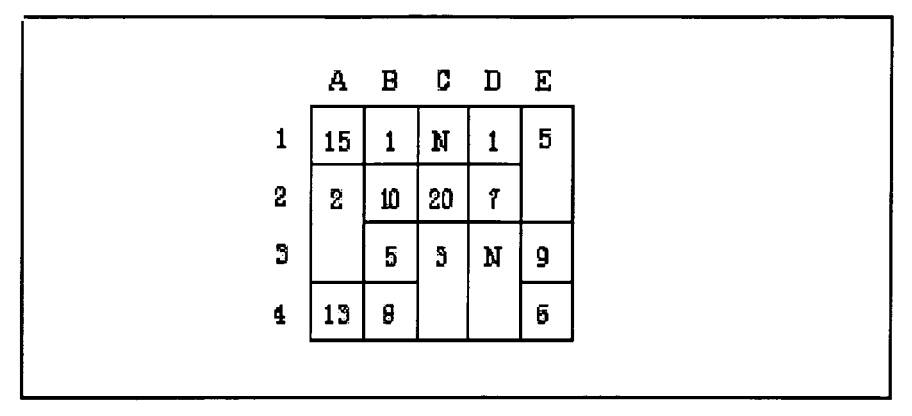

FIG. 9 is a diagram showing a third step of the data compressing process by the data merging program according to the present invention;

Figure 10:
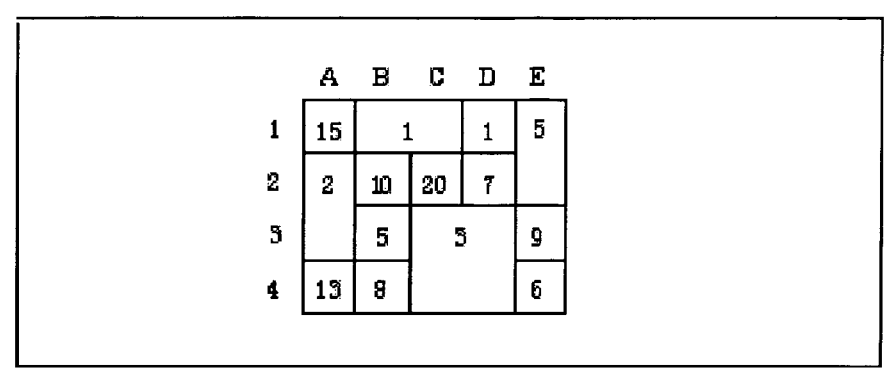

FIG. 10 is a diagram showing a fourth step of the data compressing process by the data merging program according to the present invention;

FIG. 11 is a diagram showing a fifth step of the data compressing process by the data merging program according to the present invention;

DESCRIPTION OF THE PREFERRED EMBODIMENTS

Embodiments of the present invention will be described below in detail with reference to the accompanying drawings. The following description pertains to the case in which a data merging program according to the present invention is used in a scoring system for calculating a fraud score representing the probability of fraudulent use of a credit card, but the present invention is not limited to such an embodiment. For example, the data merging program according to the present invention may be used in any case in which data in a matrix are merged.

Figure 1:
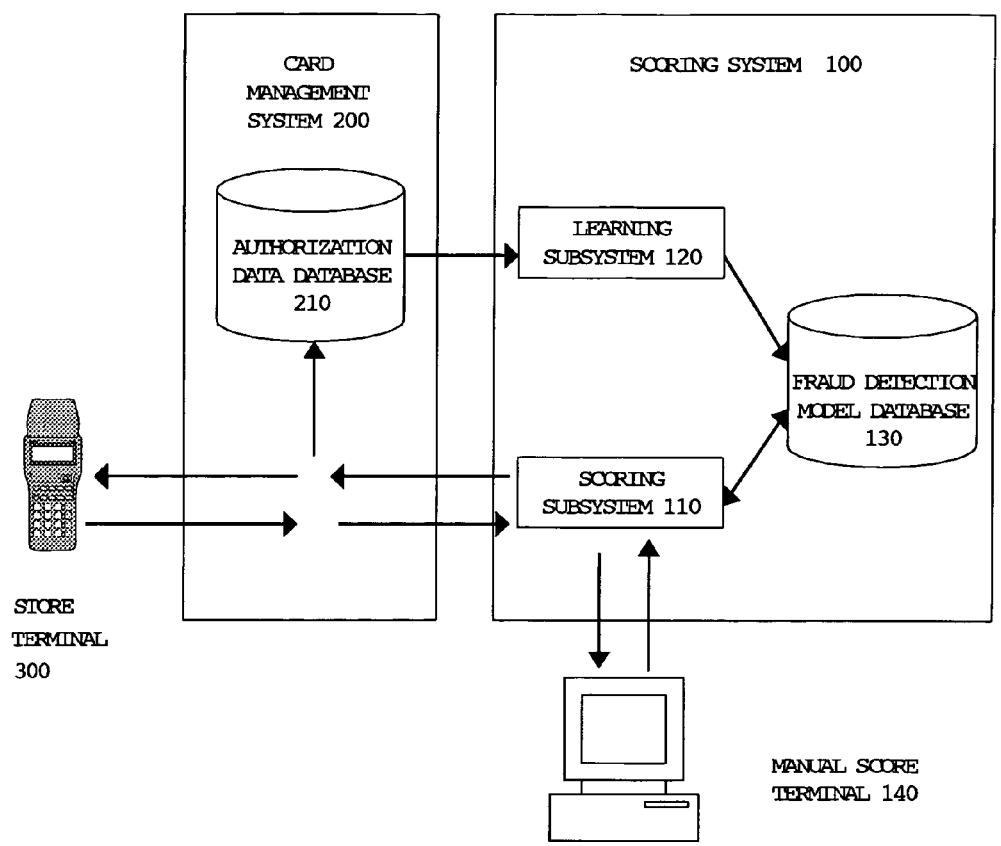
FIG. 1 is a block diagram of a scoring system according to the present invention.

In FIG. 1, a scoring system 100 according to the present invention comprises a scoring subsystem 110, a learning subsystem 120, and a fraud detection model database 130. The scoring system 100 can be operated by a manual score terminal 140. The learning subsystem 120 obtains authorization data from an authorization database 210 of a card management system 200 which is managed by a credit card company. Upon receipt of an inquiry from a store terminal 300 at the time of credit card use, the scoring subsystem 110 determines a fraud score from authorization data received through the card management system 200 and sends the result to the card management system 200, and the card management system 200 sends to the store terminal 300 the result of the inquiry, which is determined by the score.

Calculation of the score in the scoring subsystem 110 is carried out while referring to the fraud detection model database 130. The fraud detection model database 130 stores the number of samples corresponding to cases classified in a matrix whose coordinates are factors, such as the time and the monetary value of the transaction, contained in the authorization data. In the scoring system 110, sample data of a pattern corresponding to the authorization data for which an inquiry has been received are obtained, and a score is calculated.

The authorization data obtained from the authorization database 210 are used as the number of samples stored in the fraud detection model database 130. The authorization data are edited by the learning subsystem 120 so as to enable accurate and speedy scoring, and the resultant authorization data are stored in the fraud detection model database 130. The learning subsystem 120 also includes a data merging program according to the present invention which merges data contained in a matrix created from the obtained authorization data and creates the fraud detection model database 130.

Figure 2:
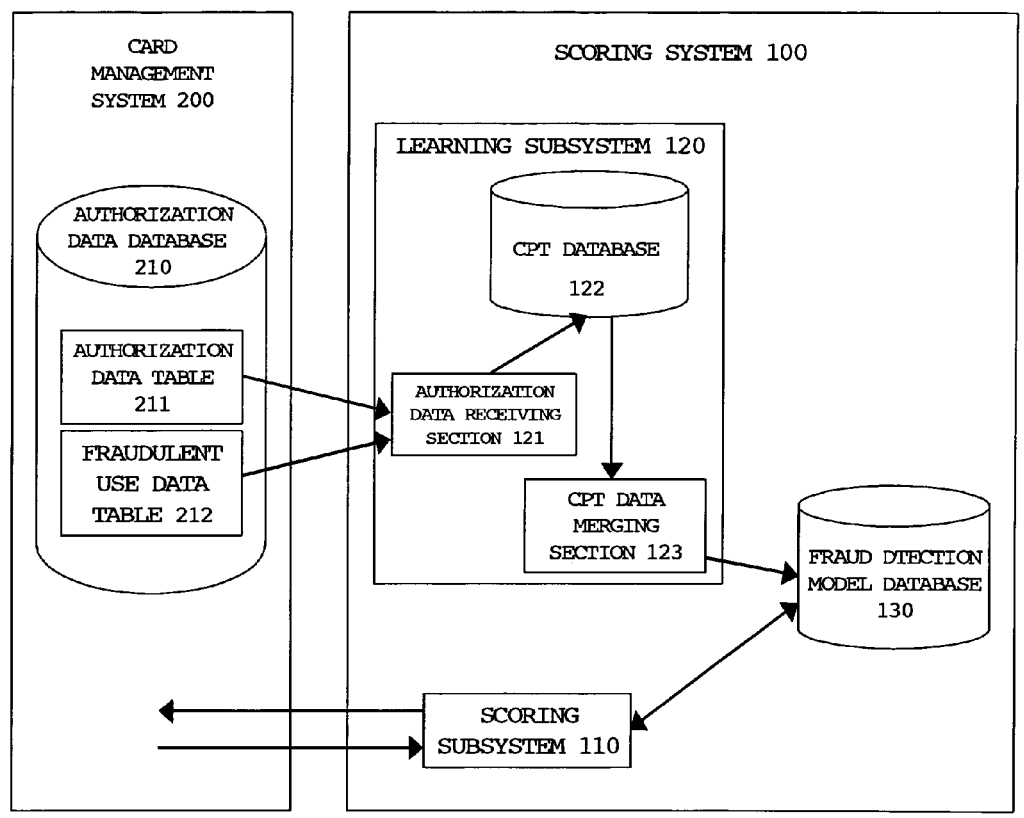
FIG. 2 is a block diagram showing the structure of the scoring stem of FIG. 1 in greater detail.

FIG. 2 shows the structure of the scoring system according to the present invention in greater detail. The learning system 120 has an authorization data receiving section 121, a CPT (Conditional Probability Table) database 122, and a CPT data merging section 123.

The authorization data receiving section 121 obtains authorization data from an authorization data table 211 of the authorization data database 210 in the card management system 200. For the obtained authorization data, the authorization data receiving section 121 determines the patterns corresponding to each of factors, such as the time and the monetary value, and the numbers of samples are stored in the corresponding cells of the CPT database 122 in which cells are arranged in a matrix whose coordinates are these factors.

Further, the authorization data receiving section 121 obtains authorization data concerning past fraudulent uses from a fraudulent use data table 212 of the authorization data database 210 in the card management system 200. For the obtained authorization data, the authorization data receiving second 121 determines the patterns corresponding to each of factors such as the time and the monetary value, and the numbers of samples are stored in the corresponding cells of the CPT database 122 in which cells are arranged in a matrix whose coordinates are these factors.

In the CPT database 122 which is created in this manner, the number of corresponding samples and the number of frauds in these samples are stored in each cell as numerical data. However, if the CPT database 122 were used without editing, the number of cells would be enormous, thereby causing the problem that, when an inquiry for authorization data is received, the arithmetic processing in the scoring subsystem 110 can be heavy, as well as the problem that the result of determination can scatter because of the decrease in the number of samples, depending on the cell. To cope with these problems, the CPT data merging section 123 merges numerical data contained in cells by the data merging program according to the present invention so that the number of cells can be decreased and the numerical data in individual cells can be kept equal to or larger than a fixed value. As a result, the created numeral data table is stored in the fraud detection model database 130 as a fraud detection model.

Next, the basic procedures of an ante-merging process and a merging process performed by the data merging program of the present invention, as well as a specific example in which numerical data recorded in cells arranged in a two-dimensional matrix are merged, will be described with reference to FIGS. 3 to 11.

Figure 3:
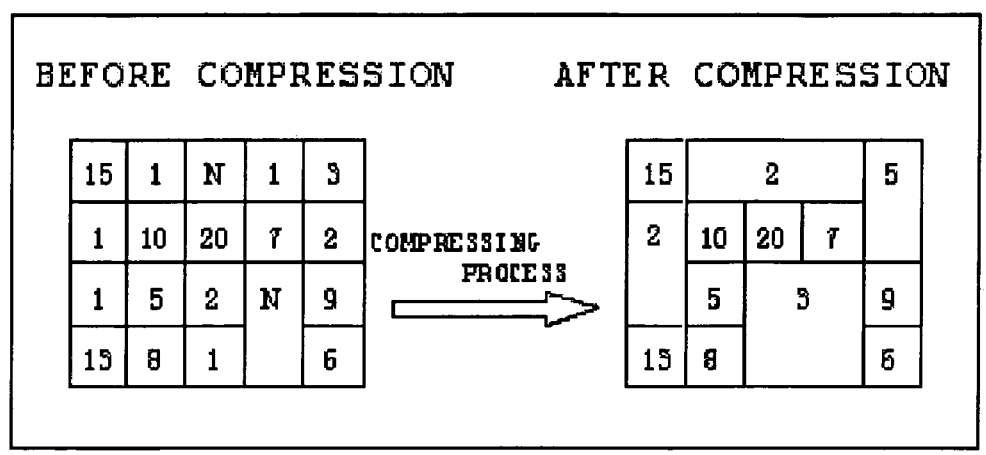
FIG. 3 is a diagram showing a difference between an ante-process matrix and a post-process matrix during a data compressing process by a data merging program according to the present invention.
Figure 5:
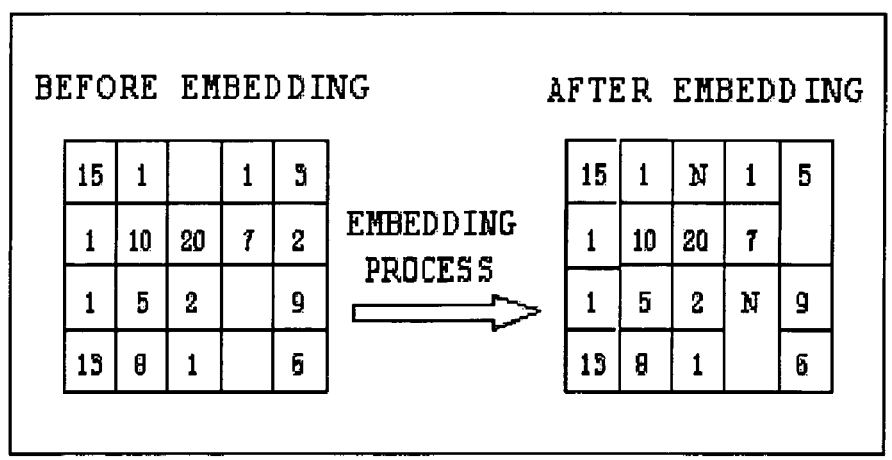
FIG. 5 is a diagram showing the manner in which NULL embedding is carried out during the data compressing process by the data merging program according to the present invention.

The matrix shown at the left in FIG. 3 is an ante-merging matrix in which the corresponding numerical data recorded in the respective cells have not yet been merged. For the cells in which the recorded numerical data do not suffice a reference value, adjacent cells are merged and the recorded numerical data are compressed to form the matrix shown at the right in this figure. As a result, it becomes possible to reduce the number of cells, and reduce the possibility that the scattering of calculation result occurs due to very small numerical values contained in the respective cells.

FIG. 4 shows an example of the data structure of data compressed by the data merging program according to the present invention. As the merging process is carried out, a composite cell into which a plurality of cells are united is formed. Because these cells include a plurality of combinations for column and/or row, the resulting data assume a so-called from-to structure.

For example, the data of the cell of column A and row 1 which have not been merged serves as data for a range from A1 to A1, and the data of the cell of column C and row 3 which have been merged serves as data for a range from C3 to D4. Given that the data have such a data structure, when an inquiry is received for data of, for example, column C and row 4, contained in a range from C3 to D4, data indicating that "the value is 3 from C3 to D4" is returned instead of the data of column C and row 4.

The specific merging process progresses in accordance with the following procedure. For the data at the starting point, as shown in the left matrix of FIG. 5, not all cells contain data; that is, occasionally some cells having no data exist. In a cell in which no data exist, "NULL" (designated by "N" in the figure) is embedded in order to define that data do not exist. If another NULL cell exists adjacent to a certain NULL cell at the time of embedding, these neighboring cells are merged in such a manner that a maximum area is secured in the neighboring range in the manner shown in the right-hand matrix of FIG. 5.

Figure 6:
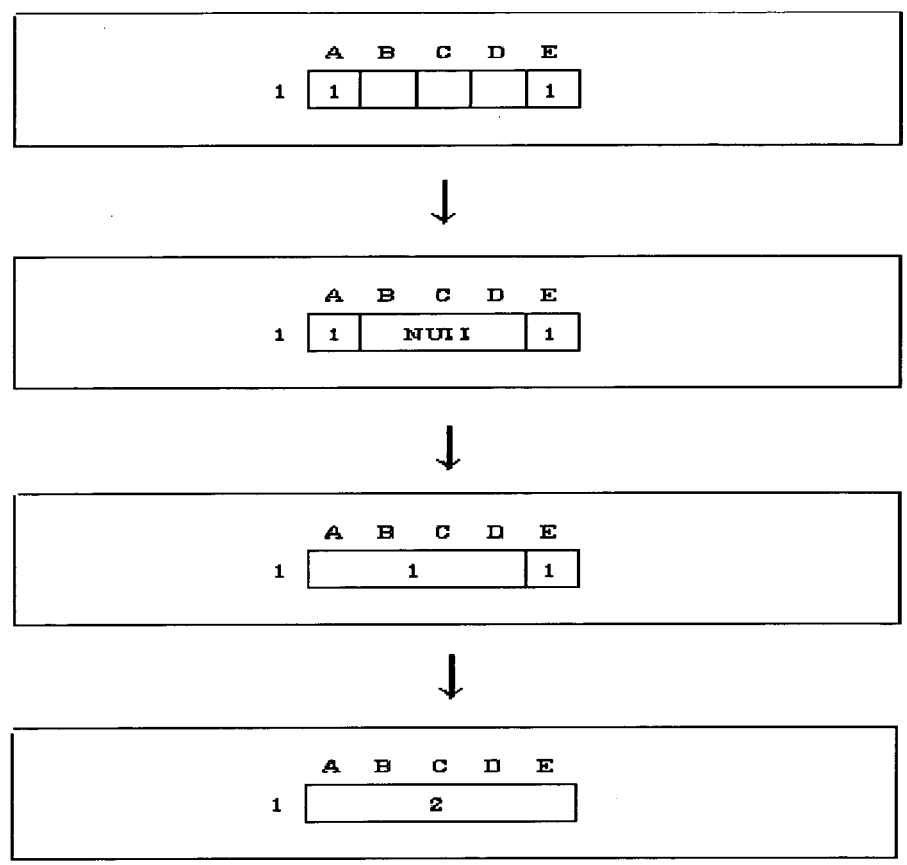
FIG. 6 is a diagram showing the basic procedure of the data compressing process by the data merging program according to the present invention.

FIG. 6 shows the basic procedure of the merging process. Assume that five cells exist in row 1 for columns A to E and no data exist in each of B1, C1, and D1. First, these neighboring cells are united into a composite cell which defines a maximum area and occupies the range B1 to D1, and then NULL is embedded in the composite cell.

Here, it is assumed that merging is performed when a total value is equal to or smaller than a reference value of 5. A numerical value contained in cell A1, serving as a start point, and numerical values contained in adjacent cells B1 to D1 are added together in order to obtain a total value. Since the total value is 1, which is smaller than the reference number of 5, these cells are merged to form a composite cell. Further, a numerical value contained in adjacent cell E1 is added to the total value to calculate a new total value. In this case, the new total value is 2, which is smaller than the reference number of 5, the cell E1 is merged with the composite cell, whereby a new composite cell is formed. As a result, the cells from A1 to E1 are merged into a single composite cell, and 2 is recorded in the composite cell as a numerical data.

Next, using FIGS. 7 to 11, there will be described a specific example in which numerical data recorded in cells arranged in a two-dimensional matrix is merged by the data merging program according to the present invention. The same merging process can be carried out in a multi-dimensional matrix on the basis of the process in the two-dimensional matrix described here.

Figure 7:
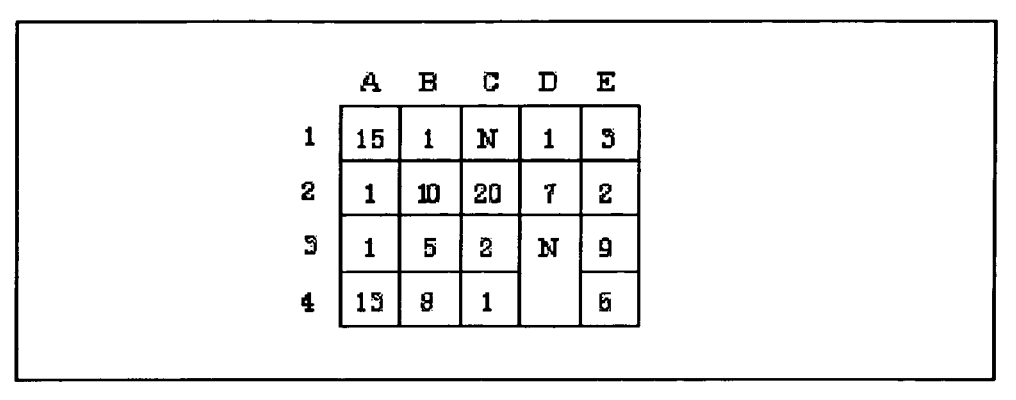

In FIG. 7, numerical data including NULL are embedded in cells arranged in a matrix. The merging process for these data is started sequentially first for columns. In this case, because the merging process is started for columns in preference to rows, the merging process progresses for the column of A1, A2, A3, and A4, then shifts to the next column of B1, B2, and so forth. Merging is performed when a total value of numerical values contained in neighboring cells is equal to or smaller than the reference value of 5.

Figure 8:
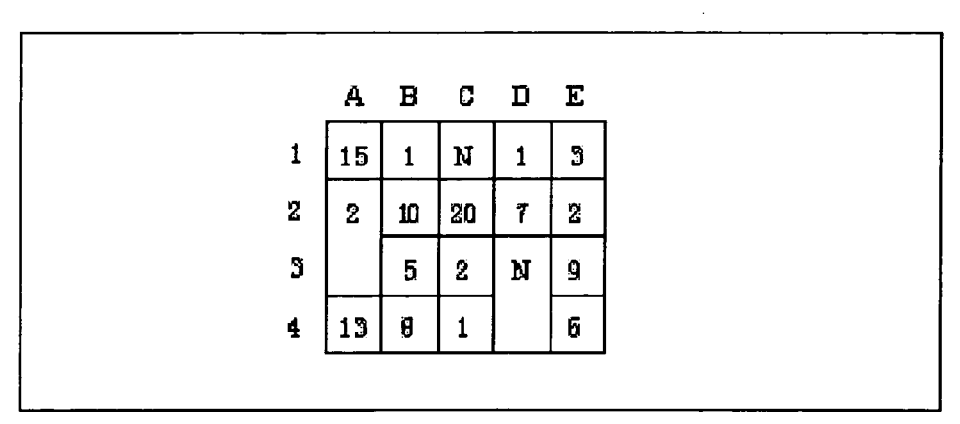

FIG. 8 shows the stage at which merging for the column A has been completed. Here, the merging process is started from A1 serving as the starting point. The numerical value contained in the cell A1 is 15 and the numerical value contained in the next cell A2 is 1, so that the total value is 16, which is larger than the reference value of 5. Therefore, no merging is carried out. Then, taking the cell A2 as the starting point, the numerical value of 1 contained in the cell A2 and the numerical value of 1 contained in the cell A3 are added together in order to obtain 2 as a total value. Since the total value of 2 is smaller than the reference value of 5, the cells A2 and A3 are merged into a single composite cell, and 2 is recorded in the composite cell. Further, when, taking the composite cell as the starting point, this total value of 2 is summed up with the numerical value of 13 contained in the cell A4, making the resultant total value 15, which is larger than the reference value of 5. Therefore, no merging is carried out.

In this example, merging is not carried out after the total value of neighboring cells has exceeded the reference value. However, the program may be set in such a manner that merging is carried out up to a point at which the total value of neighboring cells has exceeded the reference value first time. In this case, in the example of FIG. 8, merging is performed up to the cell A4, because the total value exceeds the reference value of 5 first time when the total value becomes 13 as result of the merging of the cell A4.

Because the cell A4 is disposed at an end of the column A, the merging process for the column A is finished there and the starting point of merging is shifted to the cell B1, which is located at an end of the column B. Alternatively, the starting point of merging may be shifted to the cell B4, which is located at the other end of the column B, which is adjacent to the column A. Thus, the merging process for neighboring columns is repeated sequentially until the merging for the column E is completed as shown in a matrix of FIG. 9.

Next, when the merging process is carried out for rows in preference to columns, first the merging process for one row progresses in the order of A1, B1 and so forth until the end cell E1, and then the merging process is shifted to a neighboring row, whereupon the merging process for the neighboring row progresses in the order of A2, B2 and so forth. The total value of the numerical data of A1 and B1 is 16, so no merging is carried out. However, because NULL is zero in calculation, the total value of the numerical data of B1 and C1 is 1, which is smaller than the reference value of 5. Therefore, the numerical data of B1 and C1 are merged.

At the time of merging for rows, the merging process for columns with preference to rows has already been completed; for example, one of the cells A2 and B2 has already been merged. Accordingly, the adjoining sides of these cells do not match. For the cells whose adjoining sides are different, no merging process should be carried out. After the cells whose adjoining sides match have been merged one after another, the merging process for all the rows has been completed, as shown in a matrix of FIG. 10. In this embodiment, the program is designed such that when a certain cell is merged with an adjacent cell to form a single composite cell, such a composite cell is not used as a starting point of merging; i.e., merging of two cells at maximum is carried out. The merging process for rows with preference to columns and the merging process for columns with preference to rows are alternately carried out until the entire merging is finally completed. As the final result, the cells of different adjoining sides also are merged.

Figure 11:
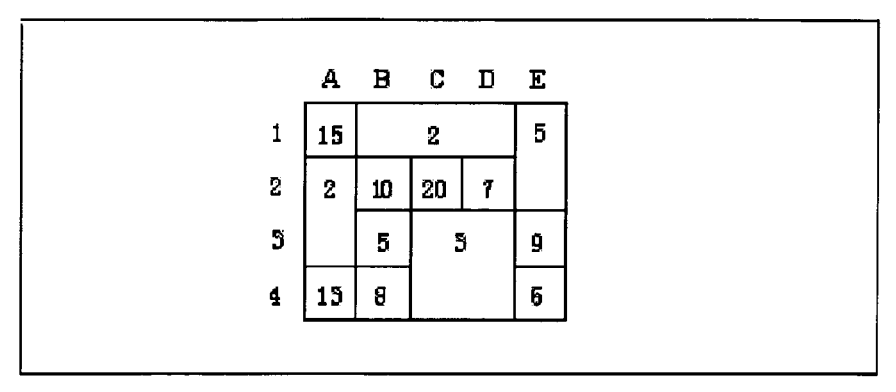

FIG. 11 shows a matrix in which the merging process for columns with preference to rows and the merging process for rows with preference to columns have been alternately carried out until no cells to be merged remain. When merging has been carried out at least one time in each of the process for columns with preference to rows and the process for rows with preference to columns, these processes are repeated. This repetition is continued until a single set of process for columns with preference to rows and process for rows with preference to columns is carried out without performance of merging.

As compared with the initial matrix of FIG. 7, the matrix of FIG. 11 is reduced in the number of cells by 6 as a result of this merging of cells, and therefore the processing load when referring to this matrix can be reduced. Further, the matrix of FIG. 11 contains no cell which does not contain data or contains a single data set, and thus scattering of numerical data contained in cells is mitigated.

Subsequently, using the flow charts of FIGS. 12 and 13, the processing flow of the data merging program according to the present invention will now be described. The following flow is an example processing flow of the data merging program according to the present invention. However, the present invention may employ various patterns of processing flow; e.g., a pattern in which the total value is changed from "equal to or smaller than the reference value" to "smaller than the reference value"; a pattern in which the process is started for rows in preference to columns rather than for columns in preference to rows; a pattern in which the process is carried out from the lower end rather than the upper end of a column; a pattern in which the process is carried out from the left end rather than the right end of a row; and a pattern in which the process whose upper limit in number of cells to be merged is two is repeated a plurality of times.

Figure 12:
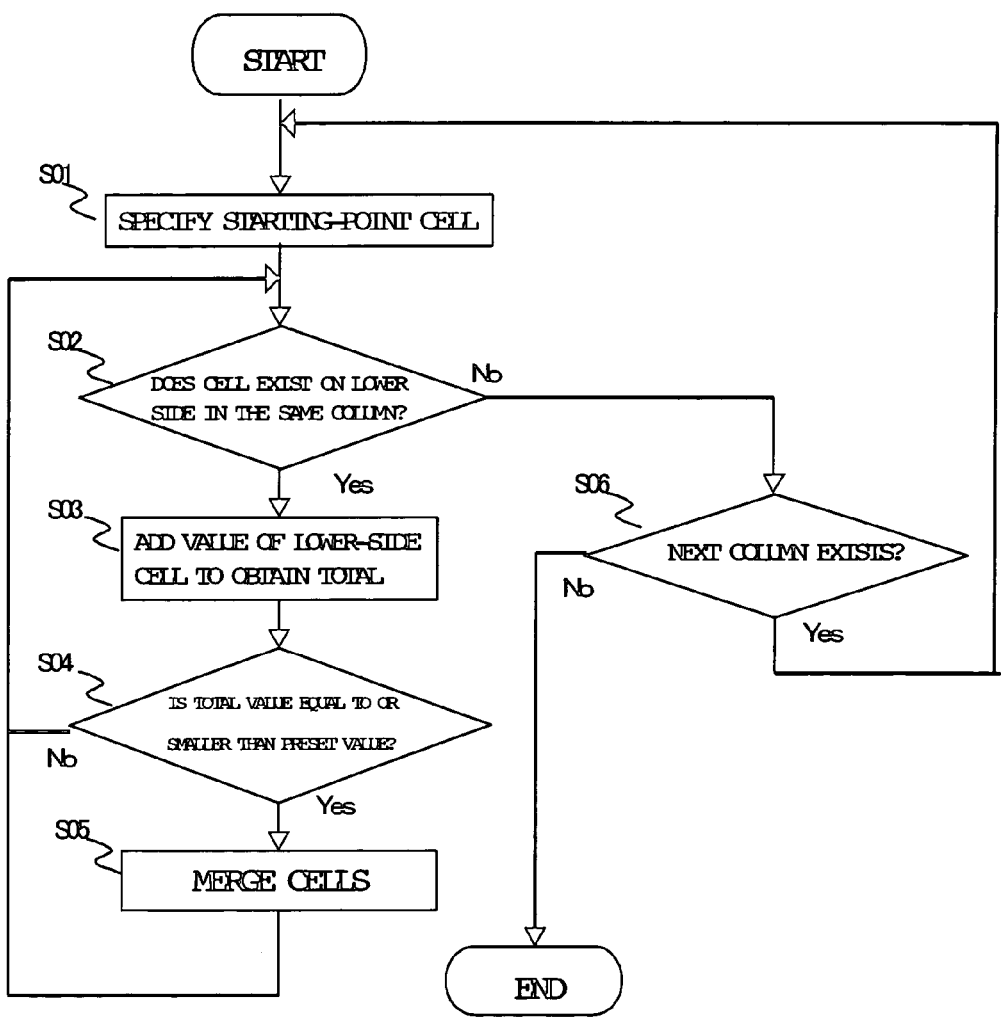
FIG. 12 is a first flow chart showing the flow of the data merging program according to the present invention.

FIG. 12 shows the flow of merging process for columns with preference to rows. First, when a cell to serve as a starting point is identified on a two-dimensional matrix (S01), a determination is made as to whether or not a neighboring cell exists under that cell in the same column (S02). If such a neighboring cell exists, a total value of numerical data contained in the starting-point cell and numerical data contained in the neighboring cell of the same column is calculated (S03). Then, a determination is made as to whether or not the calculated total value is equal to or smaller than a preset reference value (S04). If the total value is larger than the preset reference value, a cell to serve as a new starting point is identified (S01) and the process is continued. If the total value is smaller than the preset reference value, these two cells are merged (S05) and a determination is made as to whether any neighboring cell exists under that column (S02).

If the result of determination as to whether or not any neighboring cell exists under that column (S02) shows that no neighboring cell exists under that column, a determination is made as to whether or not there exists any following column adjacent to the column for which the process has been carried out (S06). If such a following column exists, a cell at an end of that following column is identified as a new starting point (S01). If such a following column does not exist, the merging process for columns with preference to rows is terminated. Subsequently, the merging process for rows with preference to columns is carried out in accordance with needs.

Figure 13:
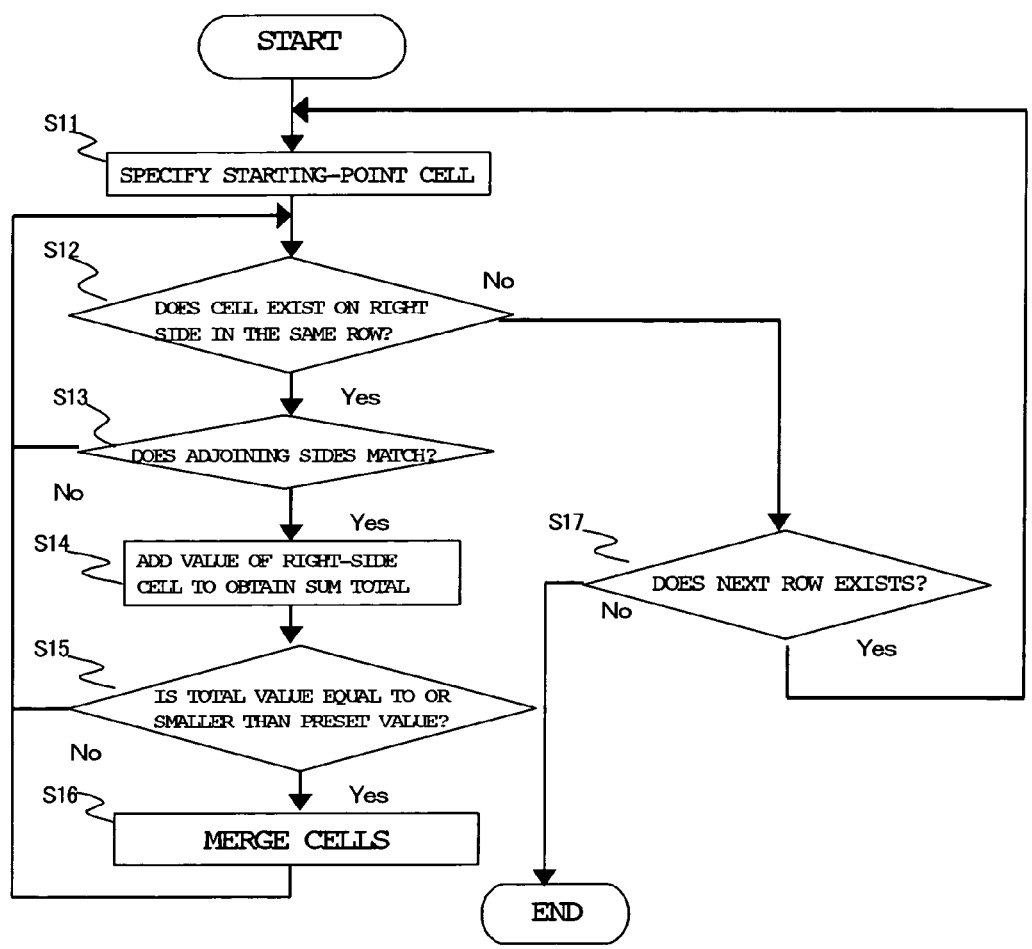
FIG. 13 is a second flow chart showing the flow of the data merging program according to the present invention.
Figure 14:
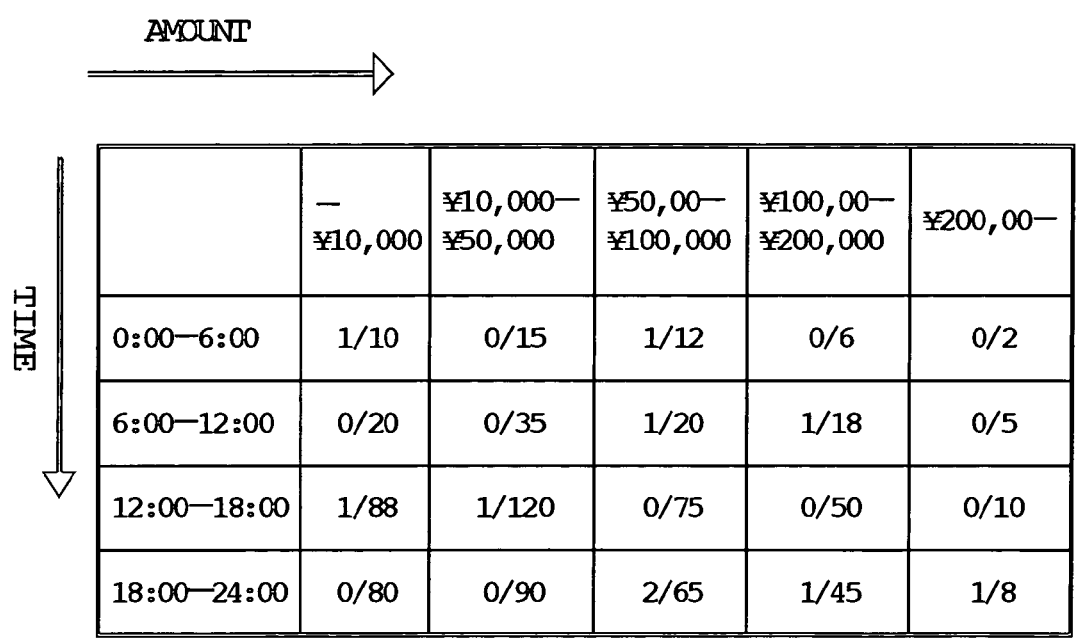
FIG. 14 is a diagram showing an example of a two-dimensional matrix used in a scoring system according to a Bayesian network.
Figure 15:
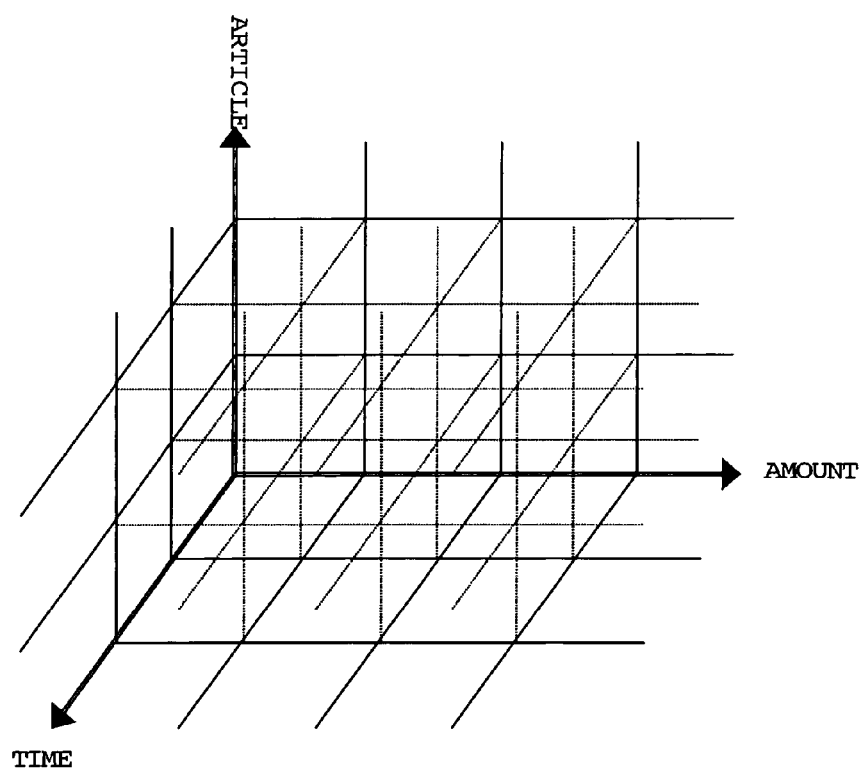
FIG. 15 is a diagram showing an example of a three-dimensional matrix used in a scoring system according to a Bayesian network.

FIG. 13 shows the flow of the merging process for rows with preference to columns. First, when a cell to serve as a starting point is identified on a two-dimensional matrix (S11), a determination is made as to whether or not any neighboring cell exists on the right of that cell in the same row (S12). If such a right cell exists, a determination is made as to whether or not the adjoining sides of these neighboring cells match (S13). If these adjoining sides are different, a cell to serve as a new starting point is identified (S11) and the process is continued. If these adjoining sides are identical, a total value of numerical data contained in the starting-point cell and numerical data contained in the right cell of the same row is calculated (S14). Then, a determination is made as to whether or not the calculated total value is equal to or smaller than a preset reference value (S15). If the total value is larger than the preset reference value, a cell to serve as a new starting pot is identified (S01) and the process is continued. If the total value is smaller than the preset reference value, these two cells are merged (S16) and a determination is made as to whether any neighboring cell exists on the right of that cell in the same row (S12).

If the result of determination as to whether or not any neighboring cell exists on the right of that cell in the same row (S12) shows that such a right cell does not exist, a determination is made as to whether or not there exists a following row adjacent to the column for which the process has been carried out (S17). If such a following row exists, a cell at an end of that following row is identified as a new starting point (S11). If such a following row does not exist, the merging process for rows with preference to columns is terminated. Subsequently, the merging process for columns with preference to rows is carried out in accordance with needs.

According to the present invention, the number of cells arranged in a matrix can be compressed, and the numerical value contained in each of the reduced number of cells can assume a value close to a preset value. Alternatively, it is possible to modify the program in such a manner that the numerical value contained in each of the reduced number of cells can assume a value equal to or larger than a predetermined value. As a result, the present invention increases the processing speed, such as the speed of processing for referring to data, and prevents scattering of data.

Through utilization of the present data merging program in merging of sample data, which are used for scoring in relation to credit inquiry of a credit card or the like, speedy and accurate scoring can be realized by use of a Bayesian network, which has hitherto been impractical. When application of a Bayesian network is realized, a credit card company or the like can easily construct a unique scoring system matching the trends of the company itself and the basis for determination of scoring can be clearly understood.

Obviously, numerous modifications and variations of the present invention are possible in light of the above teachings. It is therefore to be understood that within the scope of the appended claims, the present invention may be practiced otherwise than as specifically described herein.

What is claimed is:

1. A data merging program which merges numerical values recorded in cells arranged in a matrix in order to reduce a size of said matrix and thereby increase a speed at which said matrix is processed, said matrix being used in a scoring system for calculating a score representing a probability that a transaction is fraudulent, wherein coordinates of the cells in the matrix represent different factors contributing to the probability of a fraudulent transaction and numerical values of the cells represent numbers of samples for each of the factors, the program causing a computer to perform:
   a step of selecting a first cell as a starting point of merging;
   a step of comparing a first one of said numerical values, which is recorded in the first cell, with a reference value;
   a step of, if the first numerical value is less than or equal to the reference value, calculating a total value of the first numerical value and a second numerical value recorded in a second cell adjacent to the first cell in the same column;
   a step of comparing the total value with the reference value;
   a step of, if the first numerical value or the total value is larger than the reference value, selecting the second cell as a starting point of merging without merging the first and second cells;
   a step of, if the total value is less than or equal to the reference value, setting a third cell into which the first and second cells are merged and recording the total value in the third cell;
   a step of selecting the third cell as a new starting point of merging;
   a step of, if the cell selected as a new starting point of merging is not located at an end of a column and if a cell adjacent to that cell in the direction of merging exists, repeating said comparing and calculating steps for numerical values recorded in the third cell; and
   a step of, if the cell selected as a new starting point of merging is located at an end of a column and any cell adjacent to that cell in the direction of merging does not exist, selecting, as a new starting point of merging, a cell at an end of a column adjacent to the column in which the cell selected as a new starting point of merging exists, thereby obtaining a matrix having merged cells in order to more rapidly calculate said fraudulent transaction probability score.

2. A data merging program according to claim 1, wherein the data merging program causes the computer, upon completion of merging for all columns, to perform:
   a step of selecting a fourth cell as a new starting point of merging;
   a step of comparing an adjoining side of the fourth cell with an adjoining side of a fifth cell adjacent to the fourth cell in the same row;
   a step of calculating a total value of a fourth numerical value recorded in the fourth cell and a fifth numerical value recorded in the fifth cell if the adjoining sides of the fourth and fifth cells match;
   a step of comparing the total value with the reference value and, if the total value is smaller than the reference value, setting a sixth cell into which the fourth and fifth cells are merged and recording the total value in the sixth cell; and
   a step of selecting the sixth cell as a new starting point of merging; and
   a step of, if two adjoining sides of the fourth and fifth cells do not match, selecting a seventh cell as a new starting point of merging without merging the fourth and fifth cells, the seventh cell being adjacent to the fifth cell in a merging direction.

3. A data merging program according to claim 2, wherein the data merging program causes the computer, if two adjoining sides of the fourth and fifth cells do not match, to perform a step of selecting the fifth cell as a new starting point of merging without merging of the fourth and fifth cells.

4. A data merging program which merges numerical values recorded in cells arranged in a matrix in order to reduce a size of said matrix and thereby increase a speed at which said matrix is processed, said matrix being used in a scoring system for calculating a score representing a probability that a transaction is fraudulent, wherein coordinates of the cells in the matrix represent different factors contributing to the probability of a fraudulent transaction and numerical values of the cells represent numbers of samples for each of the factors, the program causing a computer to perform:
   a step of selecting a first cell as a starting point of merging;
   a step of comparing a first one of said numerical values, which is recorded in the first cell, with a reference value;
   a step of, if the first numerical value is smaller than or equal to the reference value, calculating a total value of the first numerical value and a second numerical value recorded in a second cell adjacent to the first cell in the same column, and setting a third cell into which the first and second cells are merged and recording the total value of the third cell;
   a step of comparing the total value with the reference value;
   a step of, if the first numerical value or the total value is larger than the reference value, selecting a fourth cell as a starting point of merging;
   a step of, if the total value is less than or equal to the reference value, selecting the third cell as a new starting point of merging;
   a step of, if the cell selected as a new starting point of merging is not located at an end of a column and if a cell adjacent to that cell in the direction of merging exists, repeating said comparing and calculating steps for numerical values recorded in the third cell; and a step of, if the cell selected as a new starting point of merging is located at an end of a column and any cell adjacent to that cell in the direction of merging does not exist, selecting, as a new starting point of merging, a cell at an end of a column adjacent to the column in which the cell selected as a new starting point of merging exists, thereby obtaining a matrix having merged cells in order to more rapidly calculate said fraudulent transaction probability score.

5. A data merging program as claimed in claim, wherein the data merging program causes the computer, upon completion of merging for all columns, to perform:

a step of selecting a fifth cell as a new starting point of merging;

a step of comparing an adjoining side of the fifth cell with an adjoining side of a sixth cell adjacent to the fifth cell in the same row;

a step of calculating a total value of a fifth numerical value recorded in the fifth cell and a sixth numerical value recorded in the sixth cell if the adjoining sides of the fifth and sixth cells match;

a step of comparing the total value with the reference value and, if the total value is smaller than the reference value, setting a seventh cell into which the fourth and fifth cells are merged and recording the total value in the seventh cell;

a step of selecting the seventh cell as a new starting point of merging; and a step of, if two adjoining sides of the fifth and sixth cells do not match, selecting an eighth cell as a new starting point of merging without merging the fifth and sixth cells, the eighth cell being adjacent to the sixth cell in a merging direction.

6. A data merging program which merges numerical values recorded in cells arranged in a matrix in order to reduce a size of said matrix and thereby increase a speed at which said matrix is processed, said matrix being used in a scoring system for calculating a score representing a probability that a transaction is fraudulent, wherein coordinates of the cells in the matrix represent different factors contributing to the probability of a fraudulent transaction and numerical values of the cells represent numbers of samples for each of the factors, the program causing a computer to perform:

a step in which a computer selects a first cell as a starting point of merging;

a step in which the computer compares a first one of said numerical values, which is recorded in the first cell, with a reference value;

a step in which, if the first numerical value is smaller than or equal to the reference value, the computer calculates a total value of the first numerical value and a second numerical value recorded in a second cell adjacent to the first cell in the same column;

a step in which the computer compares the total value with the reference value;

a step in which, if the first numerical value or the total value is larger than the reference value, the computer selects a second cell as a starting point of merging;

a step in which, if the total value is smaller than or equal to the reference value, the computer sets a third cell into which the first and second cells are merged and records the total value in the third cell;

a step of, if the cell selected as a new starting point of merging is not located at an end of a column and if a cell adjacent to that cell in the direction of merging exists, repeating said comparing and calculating steps for numerical values recorded in the third cell; and a step in which, if the cell selected as a new starting point of merging is located at an end of a column and any cell adjacent to that cell in the direction of merging does not exist, the computer selects, as a new starting point of merging, a cell at an end of a column adjacent to the column in which the cell selected as a new starting point of merging exists, thereby obtaining a matrix having merged cells in order to more rapidly calculate said fraudulent transaction probability score.

7. A data merging program as claimed in claim 6, wherein the data merging program causes the computer, upon completion of merging for all columns, to perform:

a step of selecting a fourth cell as a new starting point of merging;

a step of comparing an adjoining side of the fourth cell with an adjoining side of a fifth cell adjacent to the fourth cell in the same row;

a step of calculating a total value of a fourth numerical value recorded in the fourth cell and a fifth numerical value recorded in the fifth cell if the adjoining sides of the fourth and fifth cells match;

a step of comparing the total value with a preset reference value and, if the total value is smaller than the reference value, setting a sixth cell into which the fourth and fifth cells are merged and recording the total value in the sixth cell;

a step of selecting the sixth cell as a new starting point of merging; and a step of, if two adjoining sides of the fourth and fifth cells do not match, selecting a seventh cell as a new starting point of merging without merging the fourth and fifth cells, the seventh cell being adjacent to the fifth cell in a merging direction.

8. A data merging program which merges numerical values recorded in cells arranged in a matrix in order to reduce a size of said matrix and thereby increase a speed at which said matrix is processed, said matrix being used in a scoring system for calculating a score representing a probability that a transaction is fraudulent, wherein coordinates of the cells in the matrix represent different factors contributing to the probability of a fraudulent transaction and numerical values of the cells represent numbers of samples for each of the factors, the program causing a computer to perform:

a step in which a computer selects a first cell as a starting point of merging;

a step in which the computer compares a first one of said numerical values, which is recorded in the first cell, with a reference value;

a step in which, if the first numerical value is smaller than or equal to the reference value, the computer calculates a total value of the first numerical value and a second numerical value recorded in a second cell adjacent to the first cell in the same column, and setting a third cell into which the first and second cells are merged and recording the total value of the third cell;

a step in which the computer compares the total value with the reference value;

a step in which, if the first numerical value or the total value is larger than the reference value, the computer selects a fourth cell as a starting point of merging;

a step in which, if the total value is smaller than or equal to the reference value, the computer selects the third cell as a new starting point of merging;

a step of, if the cell selected as a new starting point of merging is not located at an end of a column and if a cell adjacent to that cell in the direction of merging exists, repeating said comparing and calculating steps for numerical values recorded in the third cell; and a step in which, if the cell selected as a new starting point of merging is located at an end of a column and any cell adjacent to that cell in the direction of merging does not exist, the computer selects, as a new starting point of merging, a cell at an end of a column adjacent to the column in which the cell selected as a new starting point of merging exists, thereby obtaining a matrix having merged cells in order to more rapidly calculate said fraudulent transaction probability score.

9. A data merging program as claimed in claim 8, wherein the data merging program causes the computer, upon completion of merging for all columns, to perform:

a step of selecting a fifth cell as a new starting point of merging;

a step of comparing an adjoining side of the fifth cell with an adjoining side of a sixth cell adjacent to the fifth cell in the same row;

a step of calculating a total value of a fifth numerical value recorded in the fifth cell and a sixth numerical value recorded in the sixth cell if the adjoining sides of the fifth and sixth cells match;

a step of comparing the total value with the reference value and, if the total value is smaller than the reference value, setting a seventh cell into which the fourth and fifth cells are merged and recording the total value in the seventh cell;

a step of selecting the seventh cell as a new starting point of merging; and a step of, if two adjoining sides of the fifth and sixth cells do not match, selecting an eighth cell as a new starting point of merging without merging the fifth and sixth cells, the eighth cell being adjacent to the sixth cell in a merging direction.

* * * * *